United States Patent Office 2,979,941
Patented Apr. 18, 1961

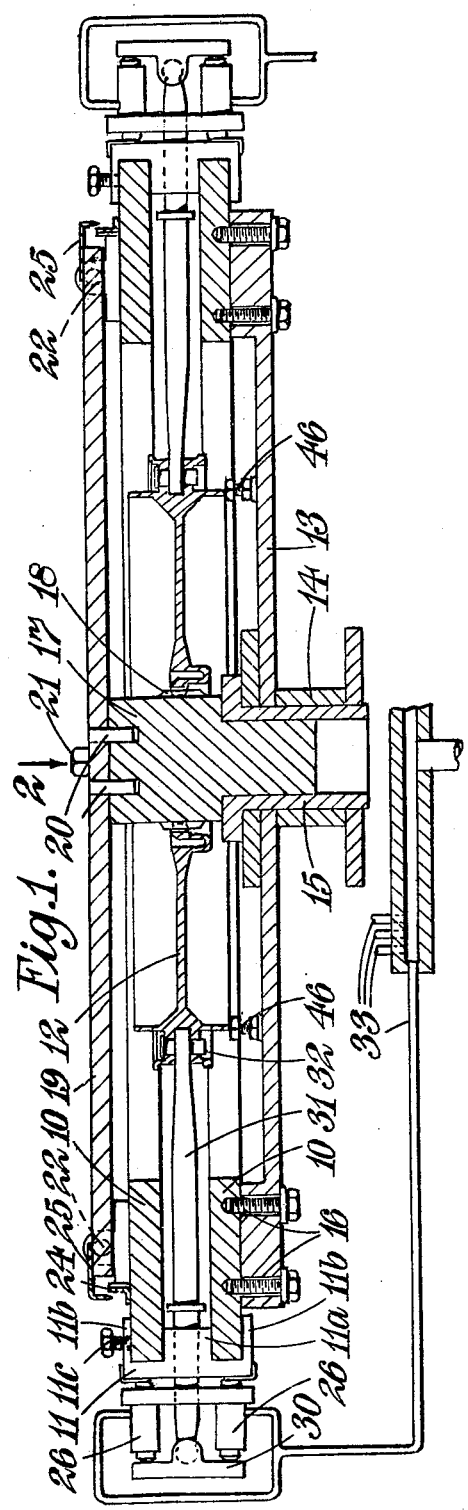

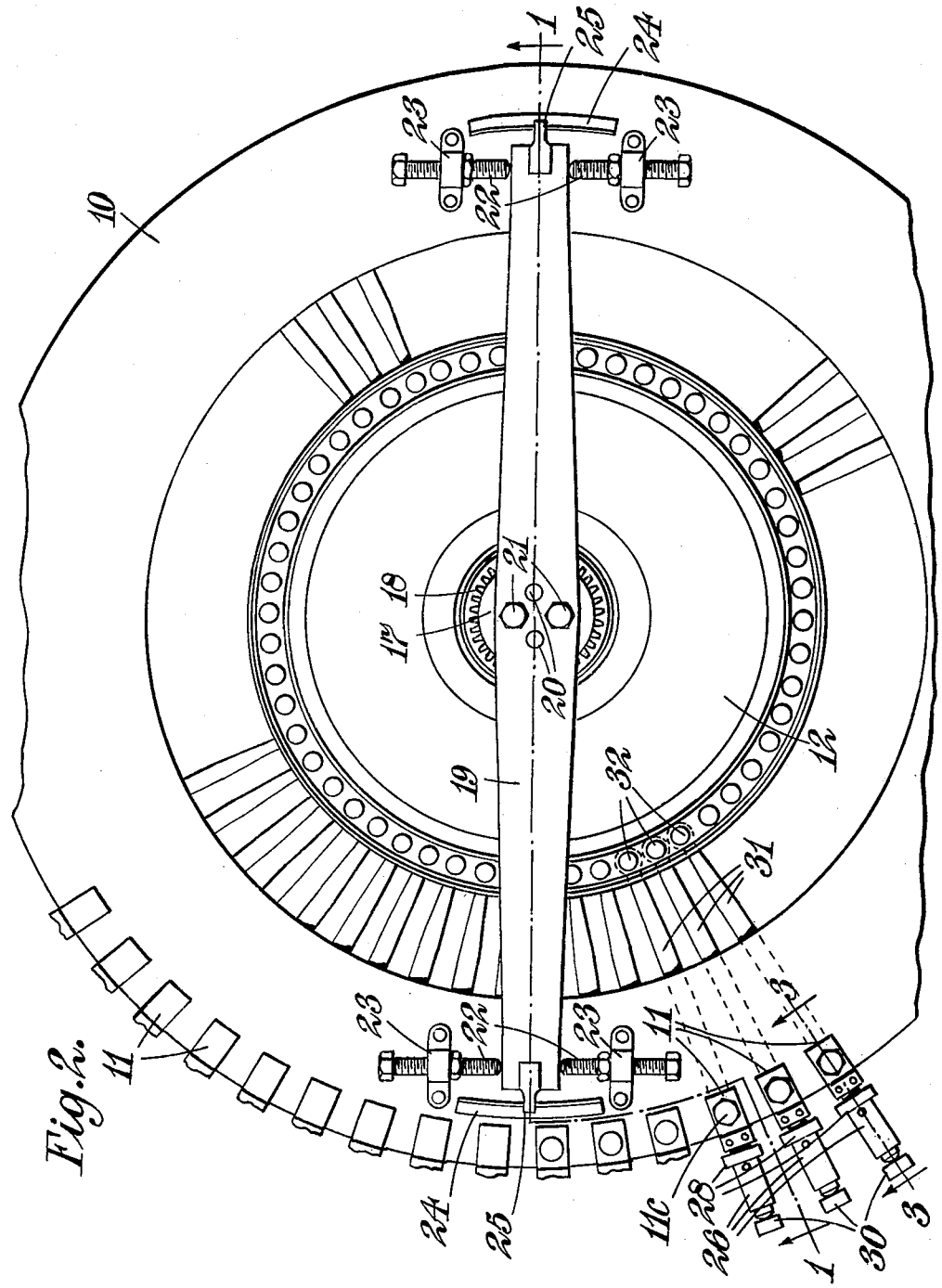

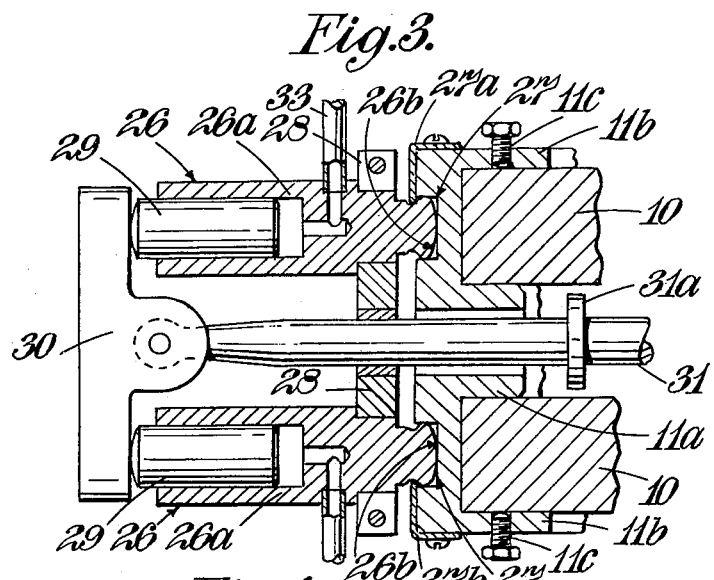
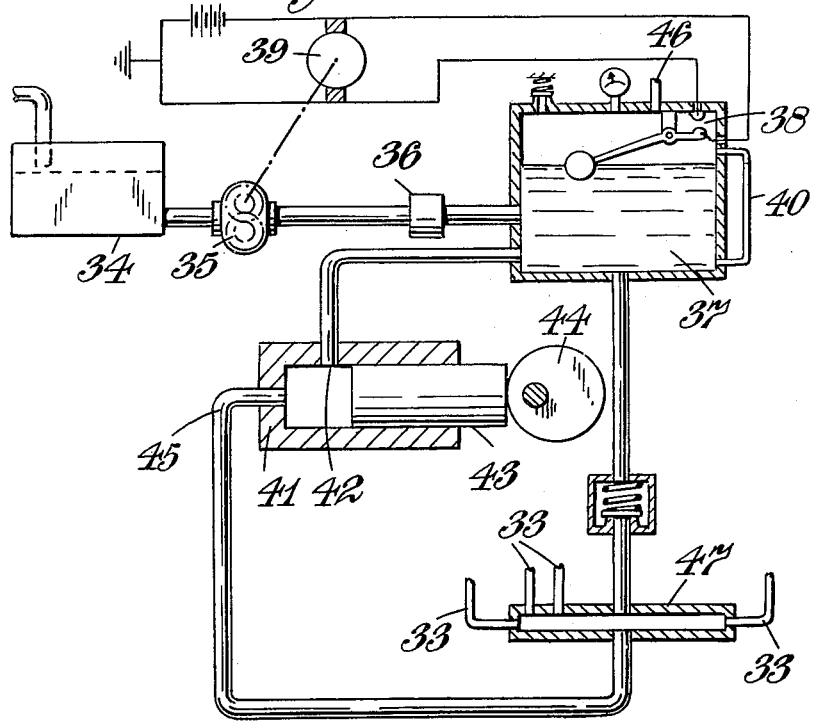

2,979,941

APPARATUS FOR TESTING OR STRETCHING ROTOR DISCS OR THE LIKE

Joseph Albert Pope, Nottingham, and Frank Nixon, Duffield England; said Nixon assignor to Rolls-Royce Limited, Derby, England, a British company Filed Mar. 3, 1958, Ser. No. 718,679

Claims priority, application Great Britain Mar. 4, 1957

6 Claims. (Cl. 73—92)

This invention relates to testing apparatus and has for an object to provide testing apparatus wherein disc-like or plate-like members, such for example as blade-carrying discs of compressors or turbines, may be subjected for example to loads simulating loads experienced in use of the member.

According to the invention, testing apparatus wherein disc-like or plate-like members may be subjected to loads simulating loads experienced in use of the members, comprises a machine frame, means supporting the member to be tested in predetermined relation to the frame, and fluid-pressure-operated means mounted on the frame and adapted for connection to the member at selected points thereon to apply predetermined loads thereto.

According to a feature of this invention, testing apparatus wherein rotor discs, such as blade-carrying discs of turbines and compressors, may be subjected to loads simulating loads experienced in use, comprises an annular frame, means connectible to the rotor disc at its centre to support the disc co-axially within the frame, a plurality of fluid-pressure-operated rams mounted on the frame at angularly spaced positions, connector elements which extend inwards from the frame towards the rotor disc, are connected to the rams to be moved radially of the annular frame and are adapted for connection to the rotor disc periphery at selected angularly-spaced points thereon, and means supplying pressure fluid to the rams to apply through the connector elements predetermined loads at said selected points on the disc. For instance, when testing a blade-carrying rotor disc of a turbine or compressor, the number of connector elements may be equal in number to the number of blades to be carried by the disc and may be connected to the disc at points corresponding to the blade positions, and the fluid pressure supply may be effected in a manner to produce in the disc loads corresponding to loads experienced in operation of the bladed rotor.

One particular application of the invention is for the testing of discs such as turbine or compressor discs in fatigue. In use, a compressor or turbine disc is subjected to a fluctuating stress arising from the starting, normal running and stopping; the stress cycle is therefore from zero to maximum, returning to zero. The apparatus of the present invention enables such a cyclic stress to be applied rapidly without incurring the major expense of running the turbine or compressor in operation. It will be appreciated that the rapidity with which a stress cycle may be applied greatly reduces the time required to complete a predetermined number of cycles to meet fatigue requirements.

A further application of the invention may be to discs, particularly those in austenitic materials, having a low yield point. With such discs it is customary to spin them to a speed above the normal running speed, to raise the yield point by minor overstressing, thus obviating the stretching which would otherwise occur on the first run-up of the engine.

Each connector element may have at its outer end suitably arranged hydraulically or pneumatically operated ram (or rams); hydraulic operation is preferred. The arrangement is such that on expansion of the rams the outer end of the connector element is moved radially outwards to apply to the disc a load having a radial component.

Preferably, moreover, the support means engaging the centre of the disc is adapted to have torsional engagement with the disc and is angularly adjustable in the frame to set the disc so that the loads applied to the rotor disc by the connector elements may be adjusted to act along lines inclined to radii through the points of connection of the connector elements to the disc.

Preferably also, the means to supply pressure liquid to the rams includes a positive-displacement pump which is arranged to deliver pressure liquid to and to relieve pressure in the rams in a cyclic manner. A variable capacity pump may be used or a relief valve may be incorporated in the hydraulic circuit to define the loads applied by the rams.

One embodiment of testing apparatus for use in testing turbine and compressor blade-carrying discs will now be described with reference to the accompanying drawings in which:

Figure 1 is an axial section through the apparatus with a disc to be tested mounted thereon;

Figure 2 is a view in the direction of arrow 2 on Figure 1 and shows the plane of section 1—1 on which Figure 1 is drawn;

Figure 3 is a section on the line 3—3 of Figure 2; and

Figure 4 shows diagrammatically a form of hydraulic pressure supply means for use with the apparatus of Figures 1 to 3.

Referring first to Figures 1 and 2, the apparatus comprises an annular frame consisting of a pair of heavy-gauge annular plates 10 which are interconnected and held accurately in spaced relation by a number of circumferentially-spaced bridge pieces 11, each of which has a central projection 11a extending between the plates 10 and determining the spacing of the plates 10 and end projections 11b extending outside the plates 10 to retain them against separation. The bridge pieces 11 are locked to the plates by set screws 11c.

The apparatus also comprises means for supporting the disc 12 to be tested coaxially within the frame, and this means comprises a heavy gauge back plate 13 with a hollow boss structure 14 at its centre to receive a bush bearing 15. The plate 13 is secured peripherally by set screws 16 to one of the annular plates 10 of the frame. The bearing 15 receives one end of a hub member 17 which is provided externally with a set of splines 18 to engage the normal splines at the centre of the disc 12, and thus the hub member supports the disc co-axially in the frame in a manner permitting angular adjustment. Such adjustment may be effected by means of a torsion bar 19 which is secured to the hub by means of dowel pins 20 and set screws 21 and which has portions extending outwardly from the hub member 17 to overlie one of the annular plates 10. The ends of the torsion bar 19 are positioned relative to the plates 10 of the frame by means of adjustment screws 22 mounted in brackets 23 on the annular plate 10 which the ends of the torsion bar 19 overlie. Clearly by adjustment of the adjustment screws 22, the angular position of the torsion bar 19 with respect to the frame can be varied. The setting of the torsion bar 19 is indicated by scales 24 on the annular plate 10 which the torsion bar overlies and the torsion bar carries pointers 25 to run over the scales. The back plate 13 carries adjustable stops 46 for positioning the disc 12 axially in the apparatus.

The apparatus also includes means to apply loads to the periphery of the disc 12. This means comprises a series of pairs of hydraulic rams 26, there being a pair of rams associated with each of the bridge pieces 11. Referring to Figure 3, it will be seen that each ram 26 has a cylinder 26a one end of which is formed with a spherical-surfaced head 26b occupying a recess 27 in the bridge piece 11 radially in line with one of the annular plates 10, and that one ram of each pair is radially aligned with one plate 10 of the ram and the other ram of the pair is aligned with the second of the annular plates 10. Retainer pieces 27a are provided to hold the spherical heads 26b against disengagement from the recesses 27.

The pairs of rams 26 are connected together by clamping means 28 so as to extend substantially radially of the axis of the frame. Each ram 26 contains a free piston 29 and the pistons of a pair of rams bear on opposite ends of a cross-head 30 to the mid-point of which is pivoted a connector element 31.

The connector elements 31 extend freely through apertures in the clamping means 28 and in the associated bridge pieces 11 towards the periphery of the disc 12 under test and are, at their inner ends, secured to the disc at points corresponding in position to the points of connection of the blades which the disc will carry in use. For instance, in the arrangement illustrated, the disc 12 is intended to have blades pivoted to its periphery and the connector elements 31 are shaped at their radially inner ends to lie between flanges through which pivot pins 32 pass to retain the blades in position and the pivot pins 32 are employed in the present arrangement to attach the connector elements 31 to the disc periphery. Flanges 31a are provided on the connector pieces 31 to prevent over-expansion of the rams 26 when the disc 12 fails.

The rams 26 are arranged to be fed with liquid under pressure through supply connections 33 leading into their cylinders 26a. When pressure fluid is delivered into the rams 26 they are expanded moving the connector elements 31 outwardly, whereby loads are applied to the disc periphery through the connector elements 31. Clearly also by suitable angular adjustment of the torsion bar 19, the connector elements 31 can be arranged to be either radial to the axis of the disc 12 or inclined to the radii from the axis of the disc through their points of connection to the disc. In the first case the loads will be purely radial loads and may be representative of centrifugal loads experienced by the disc in operation and in the second case the loads will have both radial components and tangential components and the tangential components may represent torque loads experienced by the discs in operation.

Referring now to Figure 4, there is illustrated diagrammatically one form of hydraulic pressure fluid supply for the rams 26. The apparatus comprises a reservoir 34 containing oil, the reservoir being at atmospheric pressure. Oil is drawn off from the reservoir 34 by a low pressure pump 35 and is delivered through a filter 36 into a further tank 37 in which the level of oil is maintained constant by means of a float-operated switch mechanism 38 which is arranged to control the operation of a motor 39 for driving the pump 35. The tank 37 which is subjected to any desired pressure by a pressure air supply through pipe 46, is fitted with a sight glass 40 by means of which the level of oil in the tank 37 can be observed.

Oil is lead off from the tank 37 from a bottom outlet to a pump mechanism 41 which delivers the oil under pressure through pipe 45 to a supply manifold 47 leading to the oil supply connections 33 of the rams.

The pump mechanism 41 has an inlet port 42 spaced from the outlet end of its cylinder and an operating piston 43 which is reciprocated by a suitable eccentric mechanism 44. It is arranged that on rotation of the eccentric the piston 43 first travels across the port 42, then traps a quantity of oil within the cylinder and pressurises it so raising the pressure within the rams 26, then gradually releases the pressure and finally uncovers the port 42. When the port 42 is uncovered the pressure in the system drops to the air pressure in tank 37. Thus there is always a slight pressure in the system. This avoids back lash and also provides a simple method by which at the end of each stroke any leakage is immediately made good. Furthermore by modifying the air pressure in tank 37 and the oil delivered per stroke the machine may be made to work between any positive values of stress required. The eccentric 44 may be mounted in a manner such that the degree of eccentricity of its axis of rotation can be adjusted to vary the stroke of the piston 43 or the position of the cylinder 41 relative to the centre of rotation of eccentric 44 may be adjusted so that the volume of oil displaced per stroke may be made to suit specified requirements. In either case it may also be arranged that the centre adjusting means of the eccentric may be actuated during operation so that for example the pressure cycle loadings can be varied in a random manner during testing.

Whilst in the embodiment described above the apparatus is designed for the testing of a disc in which the blades are intended to be attached by pivot pins, alternative blade fixing features may be provided, for example those of the fir-tree kind, in which case the connector elements 31 would be shaped at their radially inner ends with fir-trees corresponding with the root-fixing portions of the blades.

The apparatus is particularly suitable for carrying out fatigue tests in the manner previously mentioned, and in carrying out such tests other variables may be imposed. For example, means can be provided for heating and cooling the disc to simulate the conditions in a compressor or turbine. Likewise, a vibration may be superimposed on the disc induced mechanically or by electromagnetic means. In addition it may be desirable to attach strain gauges to the disc to study the stress pattern in the disc, and strain gauges may also be fitted in the connector elements.

Also, as indicated above the apparatus may be employed to increase the yield point of a rotor disc to obviate stretching of the disc when the engine of which it forms part is first run-up. This may be achieved by mounting the disc in the testing apparatus and by applying to its periphery through the connector elements 31 radial loads which are equivalent to centrifugal loads experienced by the disc when the engine overspeeds. In this case, the pressure of the fluid supplied to the rams 26 may be constant throughout the stressing operation.

Suitable means may be provided for restraining the outward movement of the pistons in the event of failure of a rod or pin or disc, and such means may be used to actuate a cut-out to stop the machine, thereby avoiding damage to fractured surfaces.

We claim:

1. Testing apparatus wherein rotor discs may be subjected to loads simulating loads experienced in use, comprising an annular frame, support means for engaging the rotor disc at its center and to support the disc coaxially within the frame, a plurality of fluid-pressure-operated rams mounted on the frame at angularly spaced positions, connector elements which extend inwards from the frame towards the rotor disc, said connector elements being connected to the rams to be moved radially with respect to the annular frame and being operable for connection to the rotor disc periphery at selected angularly-spaced points thereon, and means supplying pressure fluid to the rams to apply through the connector elements predetermined loads at said selected points on the disc.

2. Testing apparatus according to claim 1, wherein the pressure fluid supply means is operable to produce a cyclic variation in the pressure of the fluid supplied to the rams.

3. Testing apparatus according to claim 1, wherein the connector elements are radially displaceable by separate rams.

4. Testing apparatus according to claim 1, wherein the frame comprises a pair of annular plates and a plurality of angularly spaced bridge pieces securing the plates together in axially-spaced relation; each bridge piece supporting at axially-spaced positions a pair of said rams, each of the pair of rams having a first part mounted on the bridge piece to extend outwards from the frame and a second part which telescopes relative to the first part, cross-heads pivoted to the outer end of the connector element and bearing against the second parts of the pair of rams, and the connector element extending radially inwards through a hole in the bridge piece and between the annular plates.

5. Testing apparatus according to claim 1, wherein the support means engaging the centre of the disc is operable to have torsional engagement with the disc and is angularly adjustable in the frame to set the disc so that the loads applied to the rotor disc by the connector elements may be adjusted to act along lines inclined to radii through the points of connection of the connector elements to the disc.

6. Testing apparatus according to claim 5, wherein said support means comprises a back plate secured to the frame, a bearing supported by the back plate at its centre, a hub member rotatively supported in the bearing, the hub member being operable torsionally to engage the rotor disc, a torsion bar secured to the hub member and having its ends overlying the frame, and adjustable set screw means carried by the frame and engaging the torsion bar to select the angular position of the torsion bar.

References Cited in the file of this patent
UNITED STATES PATENTS

| | | |
|---|---|---|
| 2,081,404 | Marx | May 25, 1937 |
| 2,381,241 | Wilcox | Aug. 7, 1945 |
| 2,693,699 | Federn | Nov. 9, 1954 |
| 2,849,877 | Burgett | Sept. 2, 1958 |
| 2,865,173 | Dickie | Dec. 23, 1958 |